United States Patent
Morgan et al.

(10) Patent No.: US 11,159,204 B2
(45) Date of Patent: Oct. 26, 2021

(54) BACKPLANE WITH NEAR FIELD COUPLING TO MODULES

(71) Applicant: TEXAS INSTRUMENTS INCORPORATED, Dallas, TX (US)

(72) Inventors: Mark William Morgan, Allen, TX (US); Swaminathan Sankaran, Allen, TX (US); Benjamin Stassen Cook, Addison, TX (US); Ali Djabbari, Saratoga, CA (US); Lutz Albrecht Naumann, Geldern (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/844,861

(22) Filed: Apr. 9, 2020

(65) Prior Publication Data

US 2020/0235786 A1 Jul. 23, 2020

Related U.S. Application Data

(63) Continuation of application No. 16/036,652, filed on Jul. 16, 2018, now Pat. No. 10,623,063.

(60) Provisional application No. 62/562,579, filed on Sep. 25, 2017, provisional application No. 62/533,904, filed on Jul. 18, 2017.

(51) Int. Cl.
| | |
|---|---|
| *H04B 5/00* | (2006.01) |
| *H02J 50/10* | (2016.01) |
| *H02J 50/20* | (2016.01) |
| *H02J 50/40* | (2016.01) |

(52) U.S. Cl.
CPC ............ *H04B 5/0037* (2013.01); *H02J 50/10* (2016.02); *H02J 50/20* (2016.02); *H02J 50/40* (2016.02); *H04B 5/0087* (2013.01)

(58) Field of Classification Search
CPC ..... H04B 5/0037; H04B 5/0031; H02J 50/10; H02J 50/20; H02J 50/40
See application file for complete search history.

(56) References Cited

U.S. PATENT DOCUMENTS

| | | | | |
|---|---|---|---|---|
| 5,274,800 | A * | 12/1993 | Babb | G06F 13/37 714/32 |
| 6,724,880 | B1 * | 4/2004 | Lynch | H04L 12/2856 340/2.9 |
| 9,590,699 | B1 * | 3/2017 | Sankaran | H04B 5/0075 |
| 2001/0031046 | A1 * | 10/2001 | Troibner | H04Q 11/0428 379/202.01 |
| 2002/0118524 | A1 * | 8/2002 | Berg, Jr. | H04Q 1/023 361/796 |
| 2005/0157652 | A1 * | 7/2005 | Tang | H04L 29/06 370/238 |
| 2008/0153416 | A1 * | 6/2008 | Washiro | H01P 5/087 455/41.1 |
| 2009/0157937 | A1 * | 6/2009 | Kuschke | H01R 9/2675 710/305 |
| 2009/0291634 | A1 * | 11/2009 | Saarisalo | G06F 1/3212 455/41.1 |
| 2010/0315389 | A1 * | 12/2010 | Sorrell | H01Q 1/243 345/204 |

(Continued)

*Primary Examiner* — Devan A Sandiford
(74) *Attorney, Agent, or Firm* — Michael A. Davis, Jr.; Charles A. Brill; Frank D. Cimino

(57) ABSTRACT

A removable module includes circuitry, a near field communication (NFC) coupler to provide a data signal to the circuitry, and a second NFC coupler to supply operating voltage to the circuitry.

11 Claims, 11 Drawing Sheets

(56) References Cited

U.S. PATENT DOCUMENTS

| | | | |
|---|---|---|---|
| 2011/0217927 A1* | 9/2011 | Ben-Shalom | H04B 5/0025 455/41.1 |
| 2012/0026646 A1* | 2/2012 | Thielmann | H05K 7/1498 361/622 |
| 2012/0026647 A1* | 2/2012 | Thielmann | H05K 7/1489 361/622 |
| 2012/0031964 A1* | 2/2012 | Thielmann | H05K 7/1421 235/375 |
| 2012/0031965 A1* | 2/2012 | Thielmann | H05K 7/1421 235/375 |
| 2012/0098664 A1* | 4/2012 | Nordin | G06Q 10/087 340/572.1 |
| 2012/0185579 A1* | 7/2012 | Watanabe | H04L 41/12 709/223 |
| 2013/0135084 A1* | 5/2013 | Chakravarty | H02J 7/025 340/10.1 |
| 2013/0234883 A1* | 9/2013 | Ma | G01S 7/2813 342/174 |
| 2014/0091138 A1* | 4/2014 | Nordin | G06K 19/07749 235/375 |
| 2014/0233460 A1* | 8/2014 | Pettus | H01Q 13/06 370/328 |
| 2014/0265611 A1* | 9/2014 | Fern | H02J 7/00034 307/104 |
| 2014/0276426 A1* | 9/2014 | Borges | A61M 5/1413 604/151 |
| 2014/0285281 A1* | 9/2014 | Herbsommer | H01P 11/001 333/26 |
| 2015/0086017 A1* | 3/2015 | Taylor | H04W 12/068 380/270 |
| 2015/0089221 A1* | 3/2015 | Taylor | H04W 12/08 713/168 |
| 2015/0199192 A1* | 7/2015 | Borges | H04W 4/50 717/172 |
| 2015/0199485 A1* | 7/2015 | Borges | G16H 40/63 600/323 |
| 2015/0236512 A1* | 8/2015 | Whitney | G06F 13/4068 307/80 |
| 2015/0244427 A1* | 8/2015 | Kim | H04B 5/0037 455/41.1 |
| 2015/0253028 A1* | 9/2015 | Masuyama | H05K 7/1492 700/276 |
| 2015/0253794 A1* | 9/2015 | Palmer | H05K 7/1498 700/297 |
| 2015/0253821 A1* | 9/2015 | Palmer | G06F 1/189 361/679.31 |
| 2015/0253829 A1* | 9/2015 | Palmer | G06F 1/28 713/300 |
| 2015/0256386 A1* | 9/2015 | Palmer | H04L 41/0803 709/220 |
| 2015/0256394 A1* | 9/2015 | Palmer | H04L 41/0816 709/221 |
| 2015/0256396 A1* | 9/2015 | Palmer | H04L 67/10 709/221 |
| 2015/0256406 A1* | 9/2015 | Palmer | H05K 7/1497 709/223 |
| 2015/0256409 A1* | 9/2015 | Masuyama | H04L 41/12 370/254 |
| 2015/0257302 A1* | 9/2015 | Masuyama | G06F 1/26 713/300 |
| 2015/0257311 A1* | 9/2015 | Palmer | G05D 23/1934 700/276 |
| 2015/0277503 A1* | 10/2015 | Eremenko | G06F 1/1658 361/679.4 |
| 2015/0288422 A1* | 10/2015 | Fishman | H04W 4/80 455/41.1 |
| 2015/0300923 A1* | 10/2015 | Halbert | G07C 3/00 702/122 |
| 2015/0326437 A1* | 11/2015 | Shrestha | H04L 41/0846 709/222 |
| 2016/0182130 A1* | 6/2016 | Ahmed | H04B 5/02 455/41.1 |
| 2016/0261219 A1* | 9/2016 | Uusi-Aijo | H02J 50/10 |
| 2017/0054835 A1* | 2/2017 | Gadi | H04M 1/0277 |
| 2017/0324446 A1* | 11/2017 | Cook | H04B 5/0075 |
| 2018/0081137 A1* | 3/2018 | Rivaud | G02B 6/4452 |
| 2019/0028146 A1* | 1/2019 | Morgan | H04B 5/0087 |

* cited by examiner

BACKPLANE WITH NEAR FIELD COUPLING TO MODULES

CROSS-REFERENCE TO RELATED APPLICATIONS

This application is a continuation of U.S. patent application Ser. No. 16/036,652 filed Jul. 16, 2018, which claims priority to U.S. Provisional Patent Application No. 62/562,579 filed Sep. 25, 2017 and to U.S. Provisional Patent Application No. 62/533,904 filed Jul. 18, 2017, all of which are incorporated by reference herein.

BACKGROUND

Conventional backplane systems, such as industrial programmable logic controllers (PLC), have connectors to transmit power to the line cards. They also have expensive connectors to transmit data from card to card in a daisy chain type fashion. High speed connectors are costly, and they may have reliability issues associated with corrosion, intermittent operation, fluid contamination and wearing out.

Near Field Communication (NFC) is a wireless technology, allowing two devices to communicate over a short distance of approximately 10 cm or less. Various protocols using NFC have been standardized internationally within NFC Forum specifications and defined in ISO/IEC 18092, ECMA-340 and ISO 14443, for example. NFC allows a mobile device to interact with a subscriber's immediate environment. Contactless systems are commonly used as access control IDs (e.g. employee badges), and as payment systems for public transportation etc. Also, many credit cards include NFC capability.

SUMMARY

In described examples, a removable module includes circuitry, a near field communication (NFC) coupler to provide a data signal to the circuitry, and a second NFC coupler to supply operating voltage to the circuitry.

DETAILED DESCRIPTION OF EXAMPLE EMBODIMENTS

Figure 1:
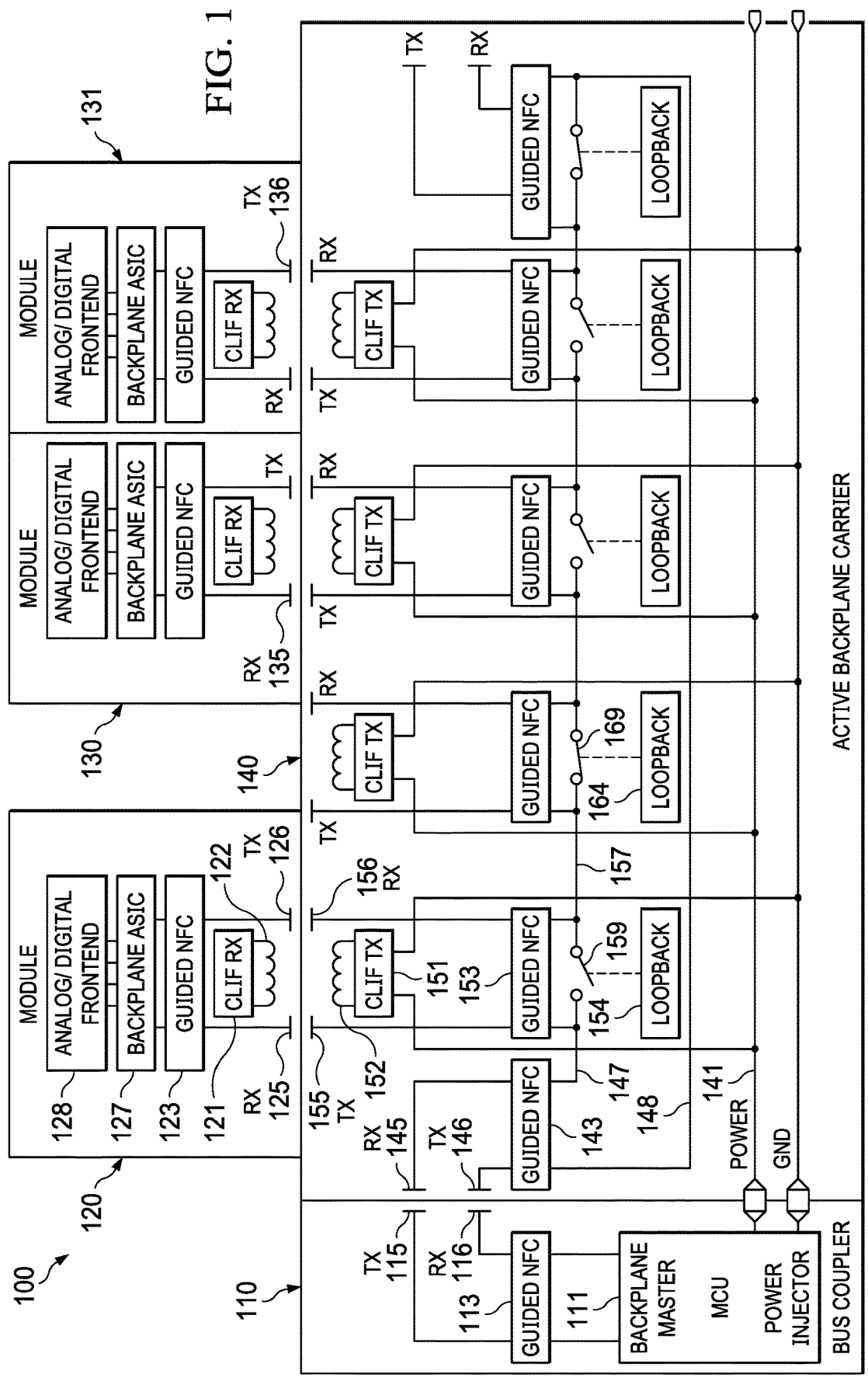
FIG. 1 is a block diagram of an example PLC system that uses NFC in place of contacts for transfer of data and power between modules and a backplane.

In the drawings, like elements are denoted by like reference numerals for consistency.

Near Field Communication (NFC) is a short-range wireless connectivity technology that uses magnetic field induction to enable communication between devices when they are adjacent to one another, such as when they physically contact (touch) each other or when they are positioned (located) within a few centimeters of each other. Several communication protocols using NFC have been standardized, such as ISO/IEC 18092, ECMA-340, and ISO 14443. The various standards specify a way for the devices to establish a peer-to-peer (P2P) network to exchange data.

Contactless systems are commonly used as access control IDs (e.g. employee badges), and as payment systems for public transportation etc. Also, many credit cards include NFC capability. However, waves in open space propagate in all directions, as spherical waves. In this way, in the far field, they lose their power proportionally to the square of the distance; accordingly, at a distance R from the source, the power is the source power divided by $R^2$. Such random wave propagation may also cause interference to other systems that are located nearby and violate emission limits set by standard bodies such as FCC.

With closely spaced NFC coupling structures to distribute signals between various modules, NFC coupling provides a low-cost interconnect solution and minimizes electromagnetic emissions. Similarly, with closely spaced NFC coupling structures to distribute power to the various modules, NFC coupling removes the need for any ohmic contacts between a backplane and removeable modules. Examples described herein provide a way to interface removable system modules without using physical/ohmic contacts.

This solution effectively eliminates connectors associated with power and data delivery and extends the bandwidth of the data transfer. This example supports a range of approximately 10-30 Gbps. Other examples may support higher frequencies by using appropriately sized NFC coupling structures. This saves the cost of the connectors and avoids associated reliability problems, such as problems of corrosion, contamination and wearing out.

An example line card includes a power chip, a high-speed data chip, and coupling coils structures for both. The backplane printed circuit board (PCB) includes a mating set of coupling coils. The pair of coils on the line card and backplane work in tandem to transfer power and data to the line card in a contactless manner. The data may be sequenced into each line card and transmitted to the next line card by daisy chaining through the backplane coupling structures. Alternatively, the data may be communicated via a multi-drop configuration to each card in place of daisy chaining and thereby reduce the bandwidth requirements for the line cards.

By transmitting power and data at the backplane interface using NFC technology, an added benefit is high voltage isolation between each line card. This eliminates the need to individually isolate the line cards at the input/output (I/O) interface and thereby allows an increase in the effective sampling rate of each line card.

FIG. 1 is a block diagram of an example PLC system 100 that uses NFC in place of contacts for transfer of data and power between modules 120, 130, 131 and a backplane 110. A programmable logic controller (PLC), or programmable controller, is a digital computer for automation of usually industrial electromechanical processes, such as control of machinery on factory assembly lines, amusement rides, light fixtures, etc. PLCs are used in many machines, in many industries. PLCs are designed for multiple arrangements of digital and analog inputs and outputs, extended temperature ranges, immunity to electrical noise, and resistance to vibration and impact. Programs to control machine operation are usually stored in battery-backed-up or non-volatile memory. A PLC is an example of a "hard" real-time system, because output results may need to be produced in response to input conditions within a limited time; otherwise, unintended operation may result. PLC systems are known and accordingly not described in detail herein; e.g. see: "Programmable Logic Controller", Wikipedia, as of Dec. 1, 2015, which is incorporated by reference herein.

This example has several modules referred to as "line cards." Various types of line cards may be installed in a chassis or rack and configured for various purposes, such as to control: manufacturing processes, heating and cooling in a building, operation of medical equipment, etc. Accordingly, electrical isolation is often needed or desirable to prevent ground loops or other interactions between various pieces of equipment that are being controlled. Conventionally, various types of isolation devices have been used, such as: optical isolators, transformers, etc.

In this example, there is a bus coupler card 110 and several line cards 120, 130, 131. FIG. 1 shows four line card module interface positions, but a chassis may include multiple interface positions to accommodate ten or more modules. A system using line cards is described herein, but example embodiments are not limited to line cards. Various types of modules may use the communication techniques described herein, in order to provide reliable communication between removable modules without the use of ohmic contacts.

In this example, bus coupler module 110 is coupled to a source of power and, in turn, produces one or more voltages that are distributed via a bus 141, which is coupled to each of the line cards via contactless electromagnet coupling. As described in more detail hereinbelow, contactless interface (CLIF) 151 with a power inverter is coupled to voltage bus 141 and generates a high frequency signal, which is impressed onto voltage coil 152. A corresponding voltage coil 122 on line card 120 is located near voltage coil 152, such that a magnetic field produced by voltage coil 152 is coupled into voltage coil 122 to produce a high frequency signal that is provided to an inverter within CLIF 121. CLIF inverter 121 converts the high frequency signal to a voltage supply, which provides operating power to circuitry on line card 120. Usually, the backplane 140 includes voltage bus(es) 141. In this example, the high frequency signal produced by inverter 151 has a frequency of approximately 6 MHz. Other examples may use higher or lower frequencies for power transmission. In this example, one watt or more of electrical energy may be transferred to each line card in this manner.

Backplane master logic 111 on bus coupler module 110 sends and receives data via a communication channel to a remote host or another rack or chassis, for example. Various types of bus coupler module 110 may accommodate a wireless or wired interface. For example, an internet connection to a local or a wide area net may be provided by bus coupler card 110. Alternatively, a wireless connection to a Wi-Fi network or to a cellular network may be provided by bus coupler module 110.

Guided NFC integrated circuit (IC) 113 receives the communication channel from master logic 111 and generates a high frequency signal that is provided to an NFC transmitting structure 115. In this example, the communication channel is propagated through a serial daisy chain (beginning with guided NFC path 147) to all the line cards and returned via guided NFC path 148 and NFC receiving structure 116 to guided NFC IC 113 and then to master logic 111.

On backplane 140, an NFC receiving structure 145 and NFC transmitting structure 146 are positioned near respective NFC transmitting structure 115 and NFC receiving structure 116, so the contactless transmission of the communication channel is facilitated between bus coupler 110 and backplane 140. Guided NFC IC 143 is coupled to receive the communication signal from NFC receiver 145 and to provide the return communication signal to NFC transmitter 146.

Guided NFC IC 143 drives the communication signal onto a guided NFC path 147. In this example, the high frequency communication signal transfer data (at a rate of approximately 1.25 Gbits/sec) uses a modulated carrier signal that has a center frequency of approximately 16 GHz. Known or later developed modulation techniques may be used to impress a digital data signal onto the carrier signal. In other examples, higher or lower frequencies may be used with known or later developed modulation techniques. Guided NFC path 147 guides the high frequency signal using known or later developed technology, such as a conductive waveguide or a non-conductive waveguide.

Guided NFC IC 153 receives the serial communication signal via guided NFC path 147 and generates a high frequency signal that is provided to NFC transmitting structure 155. The communication channel is propagated through line card 120 and returned via NFC receiving structure 156 to NFC IC 153, which then provides the serial communication channel to an adjacent module location via guided NFC path 157.

Loopback logic 154 detects when a line card, such as line card 120, is positioned near the backplane. When a line card 120 is in position, switch 159 is opened by loopback logic 154 to route the communication signal through line card 120, as described hereinabove. When no line card is in position, then switch 159 is closed by loopback logic 154 to propagate the communication signal to the next adjacent line card position. In this example, loopback logic 164 has detected no line card in position, and therefore switch 169 is closed to propagate the communication signal to the next line card position. Also, in this example, loopback logic 154 senses when a signal is being received on NFL receiver structure 156 to automatically determine whether a line card is in position. In another example, other known or later developed sensing technologies may be used to sense when a line card is in position, such as a mechanical switch, a proximity sensor, optic beam detector, etc.

On line card 120, an NFC receiving structure 125 and NFC transmitting structure 126 are positioned near respective NFC transmitting structure 155 and NFC receiving structure 156, such that the contactless transmission of the communication channel is facilitated between line card 120 and backplane 140. Guided NFC IC 123 is coupled to receive the communication signal from NFC receiver 125 and to provide the return communication signal to NFC transmitter 126.

Line card 120 includes front end analog and/or digital interface logic 128, and processing logic in application specific integrated circuit (ASIC) 127, for example. Front end interface logic 128 may provide various types of interconnection to equipment that is being controlled, such as: input and output signals, RS232/422/485 compatible signals, digital signals, analog signals, etc. Front end interface logic 128 may include various types of logic, such as: analog to digital converters (ADC), digital to analog converters (DAC), relays, contacts, etc. Processing logic 127 may include various types of hardwired and programmable logic, microcontrollers, microprocessors, memory, etc.

Line cards 130, 131, etc. may be identical to line card 120, or may have different types of front end interface logic and/or processing logic. They may include various types and combinations of processing and interface logic suitable for a given control task.

In this example, each line card is configured to communicate with its nearest neighbor on both sides via the daisy chain communication channel. For example, line card 120 may transmit via NFC transmitting structure 126 to line card 130, which has an NFC receiver structure 135. Similarly, line card 120 may receive via NFC receiver structure 125 from NFC transmitter structure 115 on bus coupler 110.

In a similar manner, each line card in system 100 may communicate with each other line card in a daisy chain manner. Each line card includes an aggregator/deaggregator logic function within the guided NFC IC, such as guided NFC IC 123 on line card 120, which enables each line card to recognize which communications on the daisy chain are destined to such line card. The aggregator/deaggregator function also allows a line card to originate a communication packet that is then provided to the daisy chain and then propagated through adjacent line cards to a final destination on a target line card. In this example, the daisy chain operates in a similar manner to an internet network protocol, and each aggregator within each guided NFC IC functions as an internet interface. In another example, a different type of known or later developed peer to peer protocol may be used.

Figure 2:
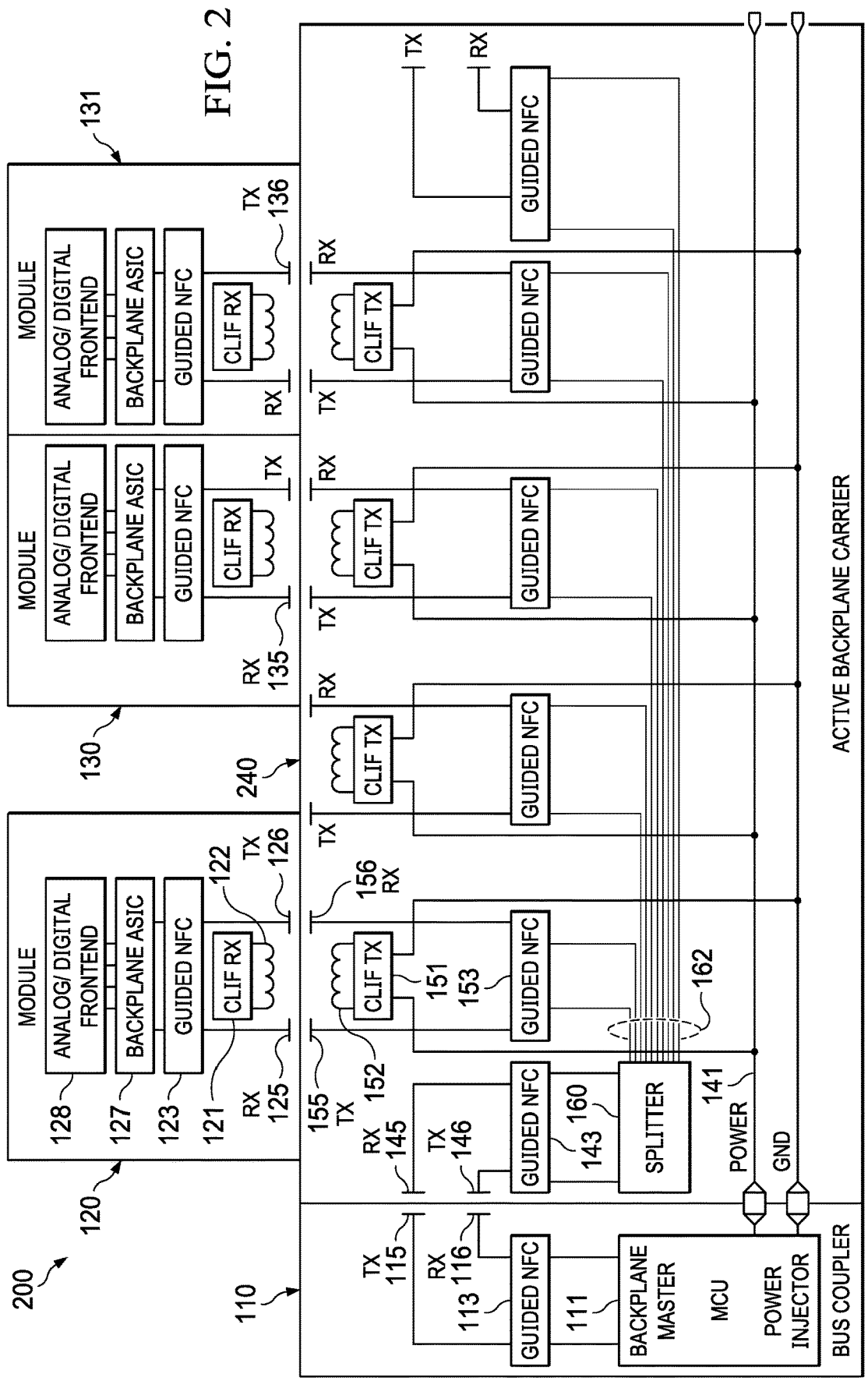
FIG. 2 is a block diagram of another example PLC system that uses NFC in place of contacts for transfer of data and power between modules and a backplane.

FIG. 2 is a block diagram of another example PLC system 200, which uses NFC in place of contacts for transfer of data and power between modules and a backplane. This example is similar to PLC system 100 (FIG. 1) and uses the same line cards. In this example, bus coupler module 110 is coupled to a source of power and, in turn, produces one or more voltages that are distributed via a bus 141. The bus 141 is coupled to each of the line cards via contactless electromagnet coupling, as described hereinabove with regards to FIG. 1.

In this example, backplane master logic 111 on bus coupler module 110 sends and receives data via a communication channel to a remote host or another rack or chassis, such as described hereinabove with regards to FIG. 1.

Guided NFC integrated circuit (IC) 113 receives the communication channel from master logic 111 and generates a high frequency signal that is provided an NFC transmitting structure 115, propagated to all of the line cards, and returned via NFC receiving structure 116 to guided NFC IC 113 and then to master logic 111. In this example, splitter 160 splits the communication channel into a star topology having multiple signals 162 that are propagated to the individual line cards in a point-to-point manner.

On backplane 240, an NFC receiving structure 145 and NFC transmitting structure 146 are positioned near respective NFC transmitting structure 115 and NFC receiving structure 116, so the contactless transmission of the communication channel is facilitated between bus coupler 110 and backplane 140. Guided NFC IC 143 is coupled to receive the communication signal from NFC receiver 145 and to provide the return communication signal to NFC transmitter 146.

Guided NFC IC 143 is connected to splitter 160, which drives a point-to-point communication signal onto multiple guided NFC paths 162. In this manner, the bandwidth requirement of the line cards may be reduced, because all of the communication traffic does not need to propagate through all of the line cards. In this example, the high frequency communication signal transfer data (at a rate of approximately 1.25 Gbits/sec) uses a modulated carrier signal that has a center frequency of approximately 16 GHz. Known or later developed modulation techniques may be used to impress a digital data signal onto the carrier signal. In other examples, higher or lower frequencies may be used with known or later developed modulation techniques. Guided NFC paths 162 guide the high frequency signal using known or later developed technology, such as conductive waveguides or non-conductive waveguides.

Guided NFC IC 153 receives the serial communication signal via one of guided NFC paths 162 from splitter 160 and generates a high frequency signal that is provided an NFC transmitting structure 155. The communication channel is propagated through line card 120 and returned via NFC receiving structure 156 to NFC IC 153, which then provides the serial communication channel back to splitter 160 via one of guided NFC paths 162.

In another example, the circuitry of the guided NFC ICs, such as guided NFC IC 153, may all be combined into a single IC that includes the function of splitter 160.

In the examples of FIG. 1 and FIG. 2, backplanes 140 and 240 include respective voltage coupling coils, such as coil 152, which are positioned at each line card position. In another example, a single unified backplane voltage coil may span across several or all of the line card positions. Each individual line card is still able to couple to the unified voltage coil and thereby receive power via contactless electromagnetic coupling, as described in more detail hereinabove.

Figure 3:
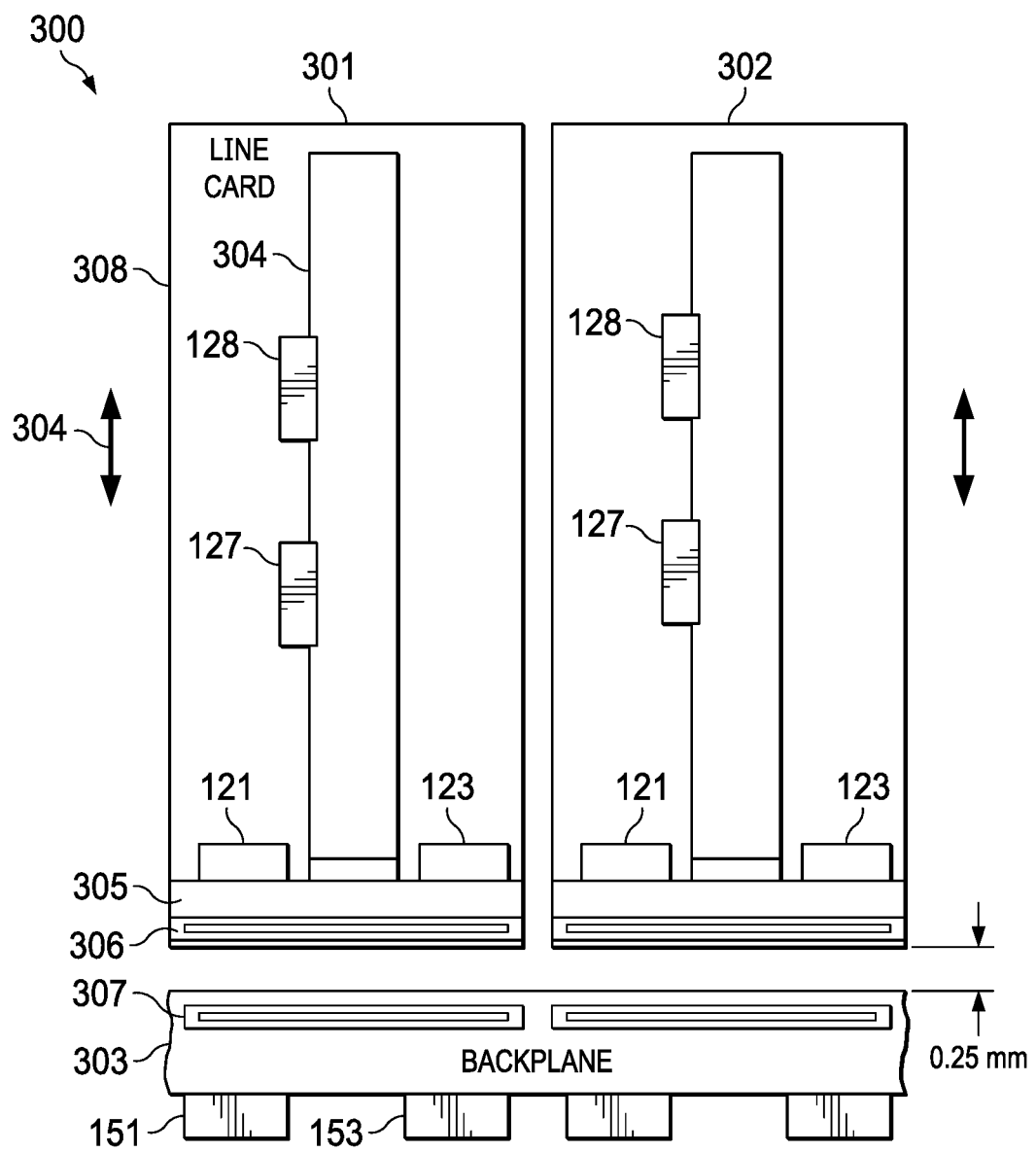
FIG. 3 is a view of an example configuration of modules and a backplane.

FIG. 3 is an edge view of an example system 300 that includes a configuration of modules 301, 302 and a portion of a backplane 303 that may be used for the example systems of FIGS. 1 and 2. Line card module 301 is representative of the various modules 120, 130, etc. of system 100 (FIG. 1) and system 200 (FIG. 2). A mechanical framework (not shown) may allow each module to be inserted and removed at a defined location relative to backplane 303, as indicated by motion arrow 304. Because all electrical coupling between modules, such as 301, 302, is contactless, a mechanical or other type of interlock structure (not shown) may retain each module 301, 302 in suitable position.

Module 301 includes a substrate 304 on which various circuit components are mounted, such as processing logic 127 (FIG. 1) and front-end logic 128 (FIG. 1).

Figure 4:
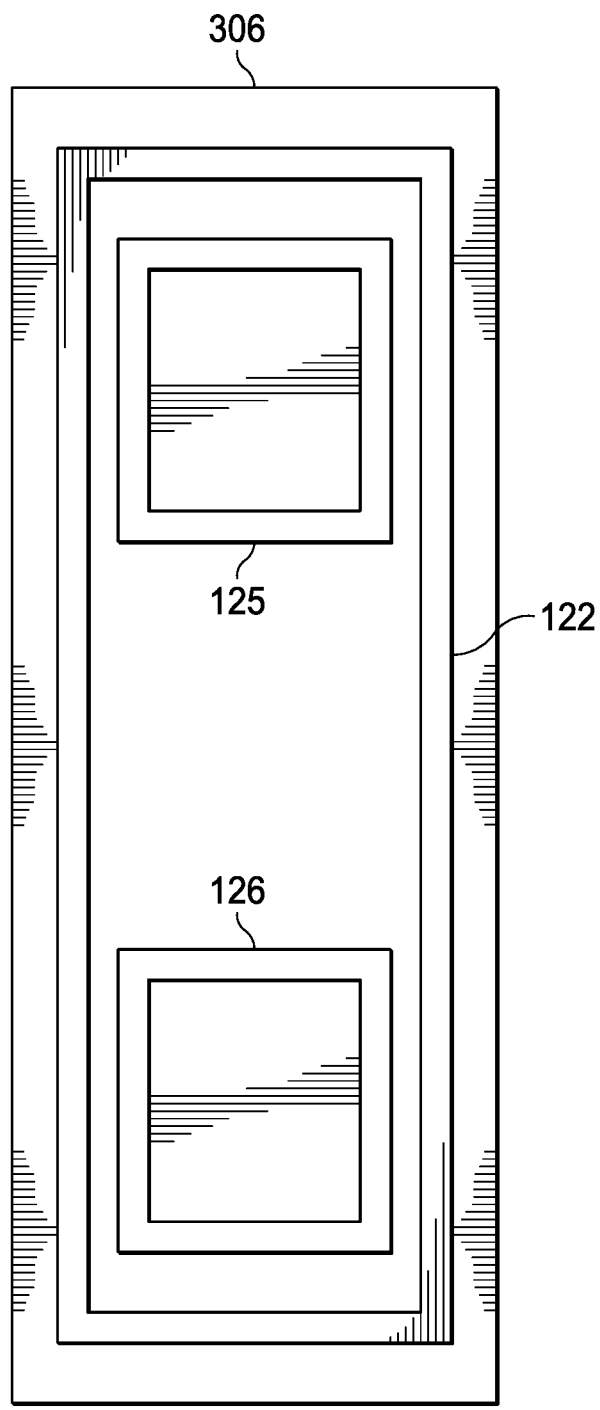
FIG. 4 is a top view of an example NFC coupler structure.

In this example, a separate substrate 305 is mounted approximately perpendicular to substrate 304, with connections therebetween to allow power and data signals to move between substrate 304 and 305. The connections may include known or later developed interconnection technology, such as soldered contacts, mating connectors, wire bonds, etc. Guided NFC IC 123 is mounted on substrate 305 and includes transmitter(s) and receivers(s), which are connected to receiver coupler 125 (FIG. 1) and transmitter coupler 126 (FIG. 1) for example. FIG. 4 shows coil assembly 306, which includes NFC receiver coupler coil 125 (FIG. 1) and NFC transmitter coupler coil 126 (FIG. 1). Some examples have a respective IC for each transmitter and receiver. In another example, one or more receivers and transmitters are formed in a single IC. The NFC coupler coils may be a separate structure mounted on substrate 305 or may be embedded within substrate 305.

Similarly, power inverter IC 121 (FIG. 1) is mounted on substrate 305 and connected to power coil 122 (FIG. 1) that is formed with coil structure 306.

Substrates 304, 305 may be a single or a multilayer printed circuit board, for example. NFC IC 123, and other ICs may be mounted on substrates 304, 305 using through hole or surface mount technology with solder bumps or bonding, depending on the frequency of operation, or other known or later developed packaging technologies. Substrates 304, 305 may be any commonly used or later developed material suitable for electronic systems and packages, such as: fiberglass, plastic, silicon, ceramic, Plexiglas, etc. In this example, substrates 304, 305 together form a "T" shaped substrate. In another example, an "L" shaped substrate, or similar configuration, may be formed that positions an NFC coils structure near a surface of a backplane or other type of carrier module. As used herein, "approximately perpendicular" covers a range of several degrees above and below ninety degrees. Similarly, the term "perpendicular" as used herein means "approximately perpendicular."

Backplane substrate 303 includes a power bus and guided NFC paths as described hereinabove with regard to backplane 140 (FIG. 1) or backplane 240 (FIG. 2). An inverter IC 151 is mounted on substrate 303 and is connected to receive power from the power bus and to provide a high frequency signal to power coil 152 (which is part of coil structure 307 of FIG. 4). NFC IC 153 is mounted on backplane substrate 303 and connected to: (a) receive guided NFC signals from adjacent modules; and (b) transmit and receive NFC signals from module 301 via transmitter coupler 155 (FIG. 1) and receiver coupler 156 (FIG. 1), which are part of coil structure 307.

Substrate 305 and backplane 303 are designed such that coupling coil structures 306 and 307 are near each other when module 301 is mechanically positioned in place. In this manner, NFC coupling may operate in near field mode, in which the separation between adjacent modules is a fraction of the wavelength ($\lambda$) of the frequency being transmitted by the transmitter(s) in NFC ICs 123, 153. For example, transmission frequencies in a range of 10 GHz to 30 GHz may be used. However, some examples may use frequencies that are higher or lower than this range. In this example, a surface of substrate 305 is positioned a distance D of approximately 0.25 mm from the surface of backplane 303, assuming: a surface of coil structure 306 is at or near the surface of substrate 305, and a surface of coil structure 307 is at or near the corresponding surface of backplane 303.

D is not required to be sub-$\lambda$ for near-field assumption. D is also dependent on the launch structure. Two criteria distinguish between near field versus far field. A transmission is in near-field if: (a) $D<\lambda$ for a NFC coupler that is sub-k in dimension; or (b) $D<2W^2/\lambda$, for a NFC coupler whose dimension W is larger than $\lambda$. For near field, D has to be less than the larger of (a) and (b).

Near field mode may produce an evanescent field that is useful to couple two adjacent NFC couplers. Evanescent fields, by their nature, exhibit an exponential decay with distance away from surface. By virtue of near proximity between backplane NFC coupler structure 307 and module NFC coupler 306 in an adjacent module that is less than one mm away, a reasonable TX-to-RX signal coupling may be achieved using the evanescent field in near field mode while mitigating emission limits/concerns outlined per FCC Part 15. In this description, the term "near" means D sufficiently proximate to enable the system to perform near field communication between respective coupling coils.

By analogy to a transformer, a strong self-coupling between coils results in reduced leakage to the external world. Furthermore, any leakage may be considered unintentional. The requirements for unintentional radiation per FCC is greatly relaxed, compared to those for intentional emissions.

Module 301 may be enclosed in a housing that is generally indicated at 308, which may be metal or plastic, for example. Usually, the housing will be a few mm thick.

FIG. 4 is a bottom view of coupling structure 306 that is on module 301 (FIG. 3). Coupling structure 307 on backplane 303 (FIG. 3) is similar. Coupling structure 306 includes NFC data receiving coupler 125, NFC transmitting coupler 126, and power coil 122. Power coil 122 includes multiple turns of a conductive material, such as copper or other metal, that is etched to form a coil structure using known or later developed printed circuit fabrication techniques. Simulations have shown that at least one watt of energy may be transferred from the backplane to each line card using a power coil structure similar to coupling structure 306.

Figure 5A:
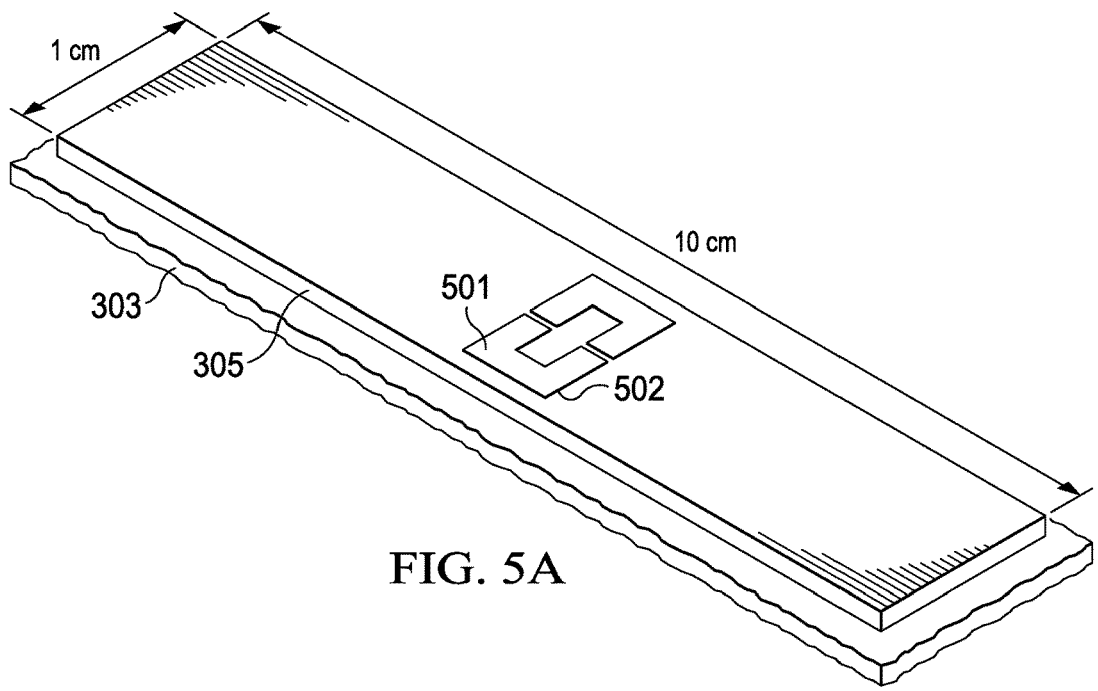
FIGS. 5A-5C are more detailed views of the example NFC coupler of FIG. 4.
Figure 5B:
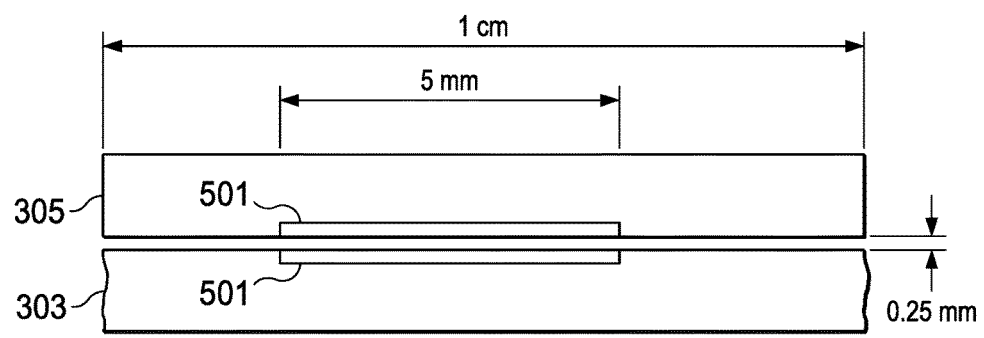
Figure 5C:
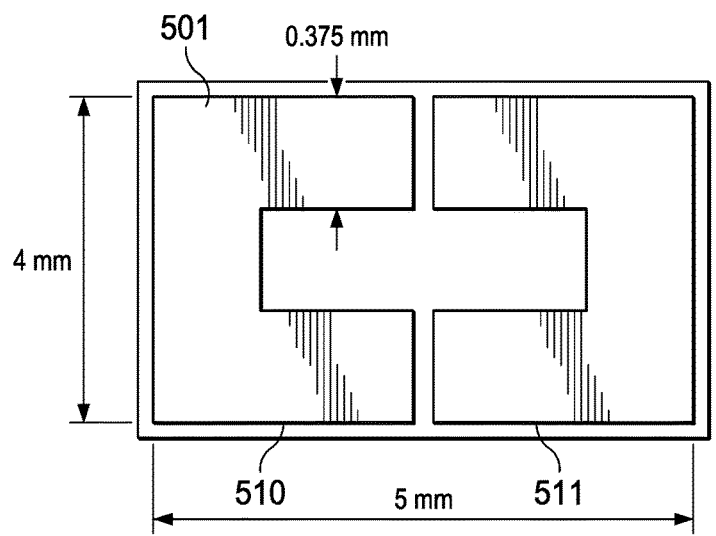

FIGS. 5A-5C are more detailed views of an example NFC coupler 501, which is representative of NFC coupler 125 of FIG. 4. NFC coupler 502 is similar to (and representative of) NFC coupler 126 (FIG. 4). FIG. 5A is an orthogonal projection of substrate 305 (FIG. 3) and a corresponding portion of backplane 303 (FIG. 3), including NFL receiver coupler 501 and corresponding NFL transmitting coupler 502. FIG. 5A is an end view, illustrating a separation between module substrate 305 and backplane substrate 303. In this example, the separation distance D is approximately 0.25 mm, but that is not a critical number and may be larger or smaller. However, to provide voltage isolation, separation distance D should be large enough to prevent electrical arching between module substrate 305 and backplane substrate 303 at a required voltage level to assure system isolation and safety.

FIG. 5C is a top view of an example NFC coupling structure 501. In this example, at least a portion of the bottom side of substrate 305 is covered by a conductive layer, such as a copper layer. The NFC field coupler 501 is formed by etching a rectangular slotted resonant structure 501. A signal line, such as differential lines 510, 511, connects the NFC field coupler to a transmitter or a receiver that is mounted on substrate 305, such as those within NFC IC 123. A mirror image structure is formed in substrate 303 and will couple with the large near field produced by slotted structure 501. In this manner, a signal (generated by a transmitter mounted on substrate 303) may be electromagnetically (EM) coupled to a coupling structure on substrate 305 and passed to a receiver mounted on substrate 305 without physical ohmic connectors and with minimal escaped radiation, or vice versa.

Figure 10:
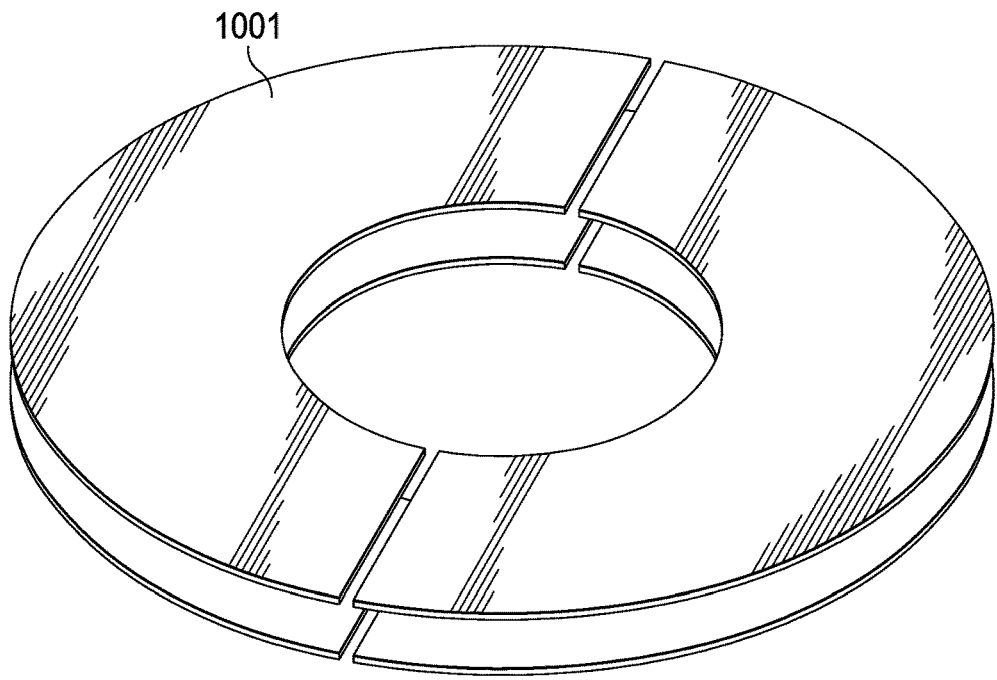
FIG. 10 is an orthogonal view of another example NFC coupler.

In another example, a different shaped slotted resonant structure may be used, such as a slotted circular resonant structure as illustrated in FIG. 10.

Figure 6:
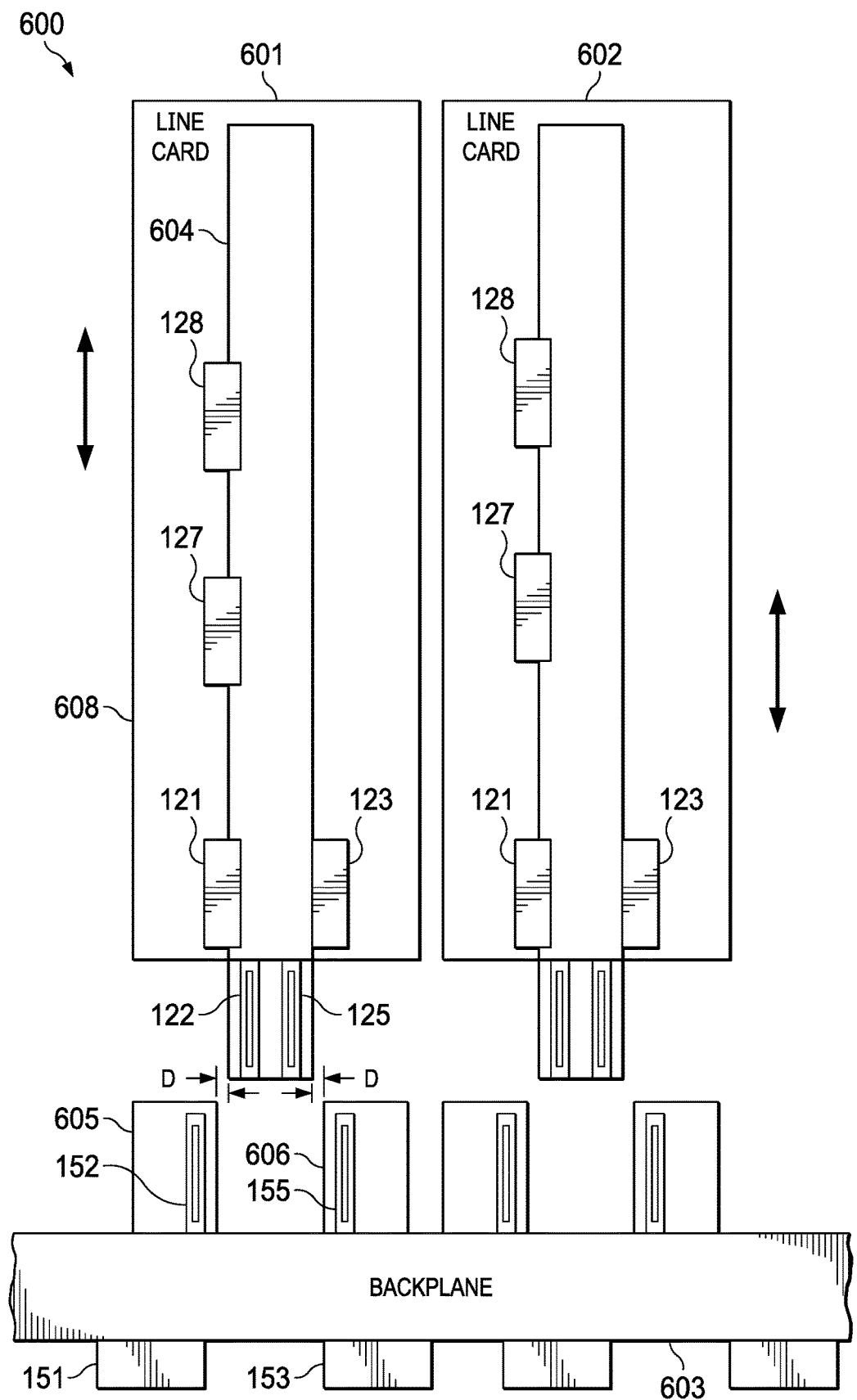
FIGS. 6-8 are views of other example of modules and backplanes.

FIG. 6 is an edge view of example system 600 that includes another configuration of modules 601, 602 and a backplane 603, which use NFC in place of contacts for transfer of data and power between the modules and the backplane. In this example, each module (such as module 601) includes a substrate 604 on which various circuit components are mounted, such as processing logic 127 (FIG. 1), and front-end logic 128 (FIG. 1). Guided NFC IC 123 is also mounted on substrate 604 and includes transmitter(s) and receivers(s), which are connected to receiver coupler 125 (FIG. 1) and to transmitter coupler 126 (FIG. 1) (not shown) for example. Some examples have a respective IC for each transmitter and receiver. In another example, one or more receivers and transmitters are formed in a single NFC IC. The NFC coupler coils may be a separate structure mounted on substrate 604, or may be embedded within substrate 604.

Similarly, power inverter IC 121 (FIG. 1) is mounted on substrate 604 and connected to power coil 122 (FIG. 1).

Substrate 604 may be a single or a multilayer printed circuit board, for example. NFC IC 123 and other ICs may be mounted on substrate 604 using through hole or surface mount technology with solder bumps or bonding, depending on the frequency of operation, or other known or later developed packaging technologies. Substrate 604 may be any commonly used or later developed material suitable for electronic systems and packages, such as: fiberglass, plastic, silicon, ceramic, Plexiglas, etc.

In this example, separate backplane mounted fins 605, 606 are mounted perpendicular to backplane substrate 603 to form a "fin" that extends from the backplane with connections therebetween to allow power and data signals to move between backplane substrate 603 and backplane mounted fins 605, 606. The connections may include known or later developed interconnection technology, such as soldered contacts, mating connectors, wire bonds, etc.

Backplane substrate 603 includes a power bus and guided NFC paths, as described hereinabove with regard to backplane 140 (FIG. 1) or backplane 240 (FIG. 2). An inverter IC 151 is mounted on backplane substrate 603 and is connected to receive power from the power bus and to provide a high frequency signal to power coil 152. NFC IC 153 is mounted on backplane substrate 603 and connected to receive guided NFC signals from an adjacent module, and to transmit and receive NFC from module 601 via transmitter coupler 155 (FIG. 1) and receiver coupler 156 (FIG. 1) (not shown). In this example, power coil 152 is mounted on fin 605 that is mounted on backplane substrate 603 and that projects perpendicularly from backplane substrate 603. Similarly, transmitter coupler 155 and receiver coupler 156 are mounted on fin 605 that is mounted on backplane substrate 603 and that projects perpendicularly from backplane substrate 603.

Substrate 604 and backplane mounted fin 605 are designed such that power coils 122 and 152 are near each other when module 601 is mechanically positioned in place. Substrate 604 and backplane mounted fin 606 are designed such that transmitter coupler 126 and receiver coupler 156 are near each other when module 601 is mechanically positioned in place. Similarly, substrate 604 and backplane mounted fin 606 are designed such that transmitter coupler 155 and receiver coupler 125 are near each other when module 601 is mechanically positioned in place. In this manner, NFC coupling may operate in near field mode, in which the separation between adjacent modules is a fraction of the wavelength (λ) of the frequency being transmitted by the transmitter(s) in NFC ICs 123, 153. For example, transmission frequencies in a range of 10 GHz to 30 GHz may be used. However, some examples may use frequencies that are higher or lower than this range.

In this example, a surface of substrate 604 is positioned a distance D of approximately 0.25 mm from a surface of substrate 605, assuming: a surface of voltage coil 122 is at or near the surface of substrate 604, and a surface of voltage coil 152 is at or near the corresponding surface of backplane mounted fin 605. Similarly, a surface of substrate 304 is positioned a distance D of approximately 0.25 mm from a surface of fin 606, assuming: a surface of coupler 125 is at or near the surface of substrate 604, and a surface of coupler 155 is at or near the corresponding surface of backplane mounted fin 606. In this example, substrate 604 extends beyond housing 608 in order to engage with backplane mounted fins 605, 606. In another example, housing 608 may include an open region to allow backplane mounted fins 605, 606 to penetrate within housing 608.

Figure 7:
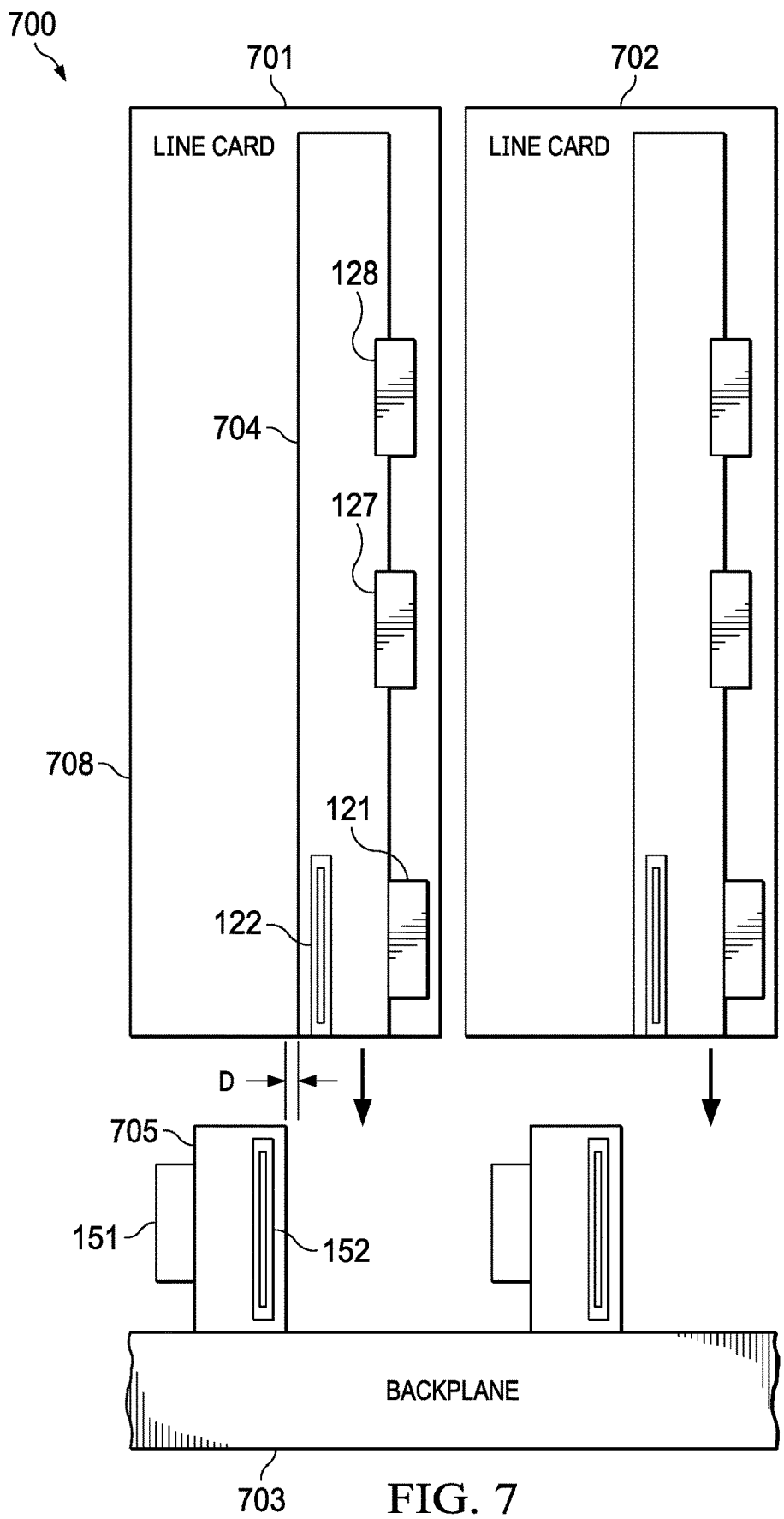
Figure 8:
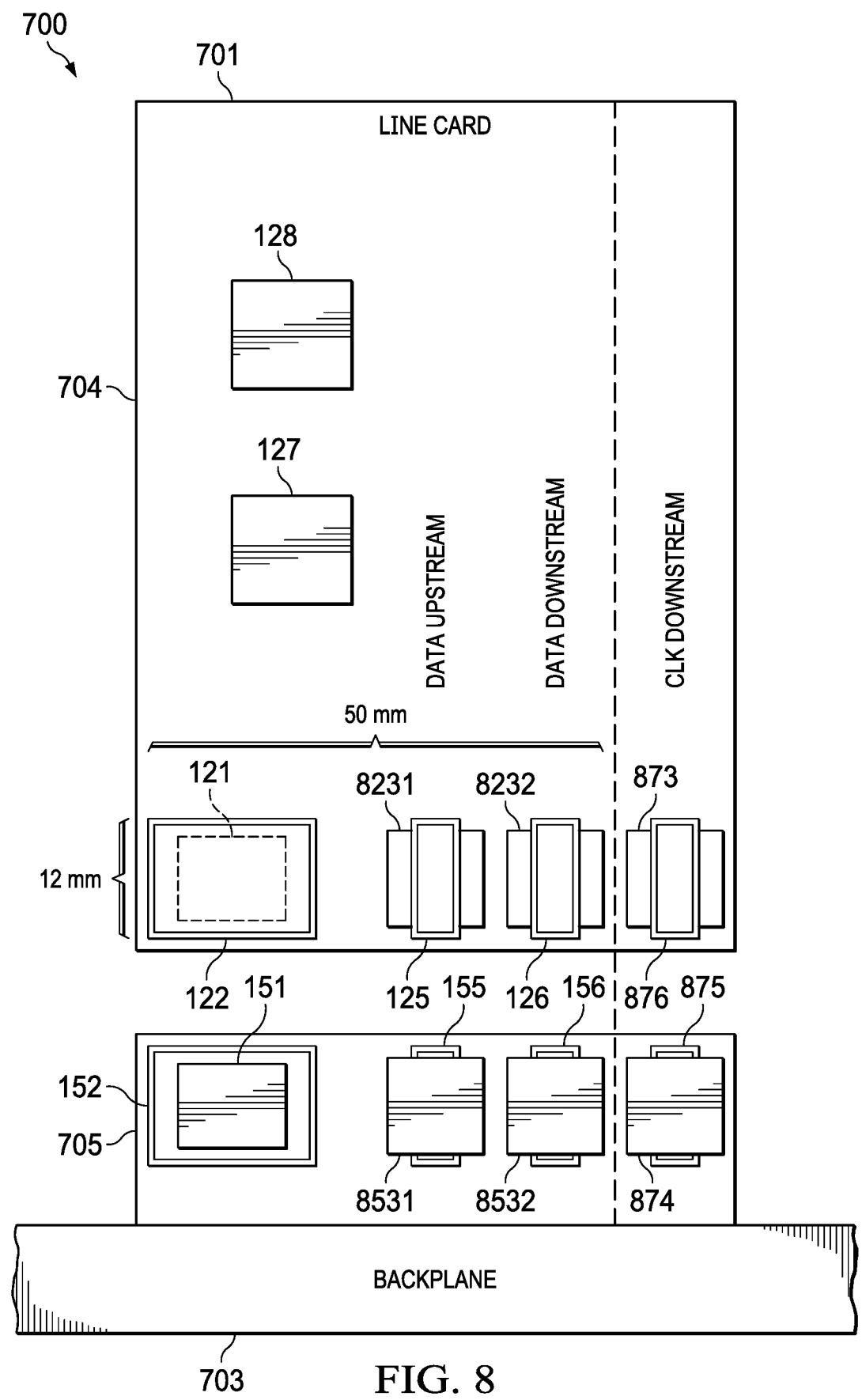

FIG. 7 is an edge view of another example of modules 701, 702 and a backplane 703, which use NFC in place of contacts for transfer of data and power between the modules and the backplane. FIG. 8 is a side view of module 701 and backplane mounted fin 705. In this example, each module (such as module 701) includes a substrate 704 on which various circuit components are mounted, such as processing logic 127 (FIG. 8), and front-end logic 128 (FIG. 8). Guided NFC IC 8231 (FIG. 8) is also mounted on substrate 704 and includes receivers(s), which are connected to receiver coupler 125 (FIG. 8). In this example, a separate NFC IC 8232 is connected to transmitter coupler 126 (FIG. 8). The NFC coupler coils may be a separate structure mounted on substrate 704, or may be embedded within substrate 704. Similarly, power inverter IC 121 (FIG. 8) is mounted on substrate 704 and connected to power coil 122 (FIG. 8).

Substrate 704 may be a single or a multilayer printed circuit board, for example. NFC IC 123 and other ICs may be mounted on substrate 704 using through hole or surface mount technology with solder bumps or bonding, depending on the frequency of operation, or other known or later developed packaging technologies. Substrate 704 may be any commonly used or later developed material suitable for electronic systems and packages, such as: fiberglass, plastic, silicon, ceramic, Plexiglas, etc.

In this example, backplane mounted fin 705 is mounted perpendicular to backplane substrate 703, with connections therebetween to allow power and data signals to move between backplane substrate 703 and backplane mounted fin 705. The connections may include known or later developed interconnection technology, such as soldered contacts, mating connectors, wire bonds, etc.

Backplane substrate 703 includes a power bus and guided NFC paths as described hereinabove with regard to backplane 140 (FIG. 1) or backplane 240 (FIG. 2). In this example, an inverter IC 151 is mounted on backplane mounted fin 705 and is connected to receive power from the power bus and to provide a high frequency signal to power coil 152. NFC IC 8531 (FIG. 8) is mounted on backplane mounted fin 705 and connected to: (a) receive guided NFC signals from an adjacent module; and (b) transmit NFC signals to module 701 via transmitter coupler 155 (FIG. 8). A separate NFC IC 8532 is connected to receiver coupler 156 (FIG. 8). In this example, power coil 152 is mounted on fin 705. Similarly, transmitter coupler 155 (FIG. 8) and receiver coupler 156 (FIG. 8) are mounted on fin 705.

In this example, a clock signal (CLK) is also propagated from backplane 703 to each module using NFC. NFC coupler 875 is located on backplane mounted fin 705, and NFC coupler 876 is located on substrate 704. NFC couplers 875 and 876 are designed to be near (in close proximity to) one another when line card 701 is installed in system 700. In this example, a separate NFC IC 874 is mounted on substrate 705 and connected to drive a clock signal to NFC coupler 875. Similarly, a separate NFC IC 873 is mounted on substrate 704 and connected to receive the clock signal from NFC coupler 876.

Some examples have a respective NFC IC 8231, 8232, 873, 8531, 8532, 874 for each transmitter and receiver. In another example, one or more receivers and transmitters are formed in a single NFC IC, such as NFC ICs 123, 153 (FIG. 1).

Substrate 704 and backplane mounted fin 705 are designed such that power coils 122 and 152 are near each other when module 701 is mechanically positioned in place. Substrate 704 and backplane mounted fin 705 are designed such that transmitter coupler 126 and receiver coupler 156 are near each other when module 701 is mechanically positioned in place. Similarly, substrate 704 and backplane mounted fin 705 are designed such that transmitter coupler 155 and receiver coupler 125 are near each other when module 701 is mechanically positioned in place. In this manner, NFC coupling may operate in near field mode in which the separation between adjacent modules is a fraction of the wavelength ($\lambda$) of the frequency being transmitted by the transmitter(s) in NFC ICs 123, 153. For example, transmission frequencies in a range of 10 GHz to 30 GHz may be used. However, some examples may use frequencies that are higher or lower than this range.

In this example, a surface of substrate 704 is positioned a distance D of approximately 0.25 mm from a surface of fin 705, assuming: a surface of voltage coil 122 is at or near the surface of substrate 604, and a surface of voltage coil 152 is at or near the corresponding surface of backplane mounted fin 605.

In this example, line card module 701 is designed with an opening in housing 708 to allow backplane mounted fins to penetrate within housing 708 when module 701 is installed in system 700. In another example, substrate 704 may extend beyond housing 708, similar to the example of FIG. 6.

Figure 9:
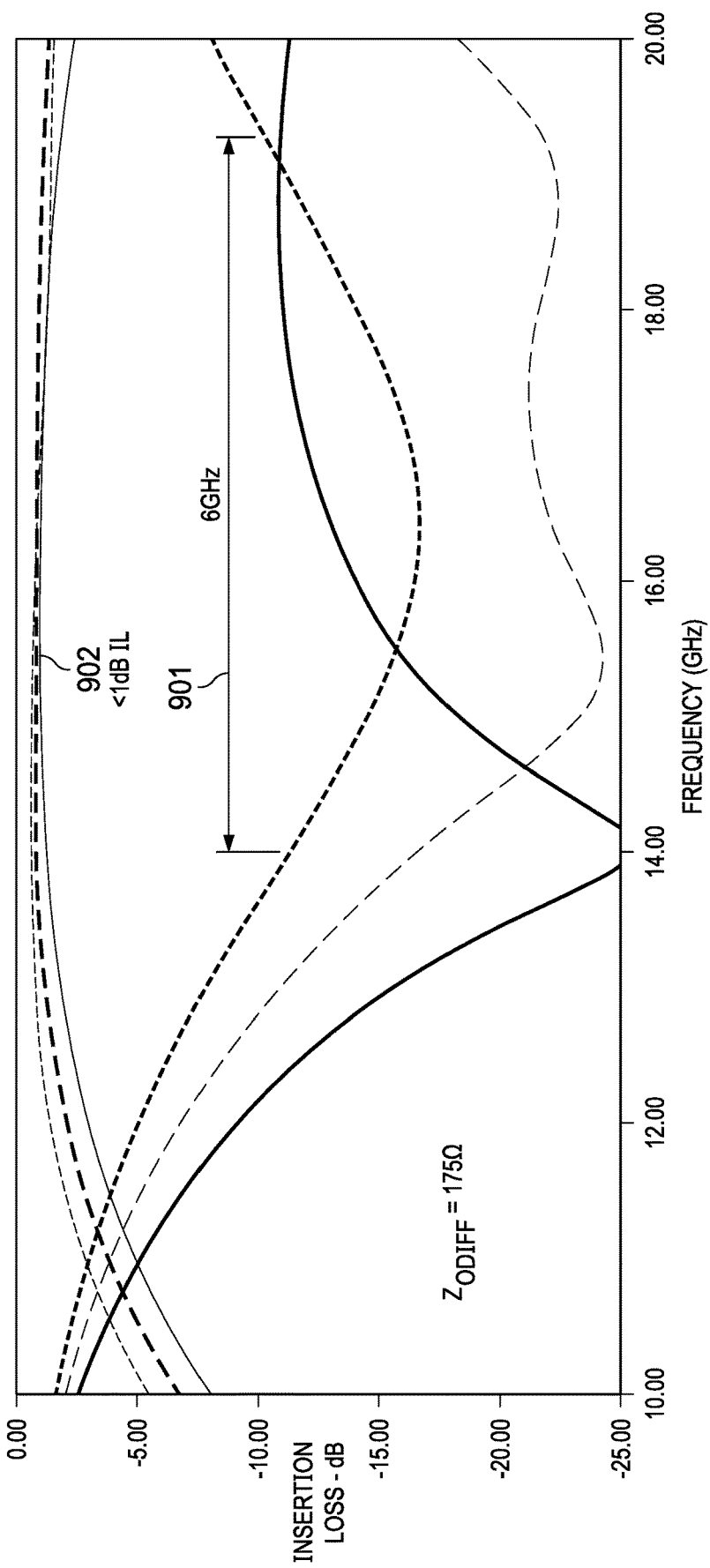
FIG. 9 is a plot of insertion loss caused by the NFC coupler of FIGS. 5A-5C.

FIG. 9 is a plot of insertion loss (dB) vs frequency (GHz) caused by the NFC coupler 501, 502 of FIGS. 5A-5C, which is representative of each of the NFC configurations described hereinabove. In this example, the guided NFC pathways on the backplane substrates and line card substrates are differential signals that have a characteristic impedance of approximately 175 ohms. NFC couplers 501, 502 are designed to match that characteristic impedance. Simulations have shown that a bandwidth 901 of over 6 GHz can be obtained in a frequency range of 14-20 GHz with an insertion loss of less than 1 dB using the techniques described hereinabove.

In this manner, a low-loss, EMI controlled near-field based channel for communications channels is achieved, which is not a radiative and does not use travelling waves. The transition region surrounding couplers 501, 502 may be surrounded by electronic bandgap structures/electrical/magnetic/absorbing surfaces to contain any additional unintentional EMI.

FIG. 10 is an orthogonal view of another example NFC coupler 1001. This is a circular slotted resonant structure that operates in a similar manner to example NFC couplers 501 (FIG. 5C).

Figure 11:
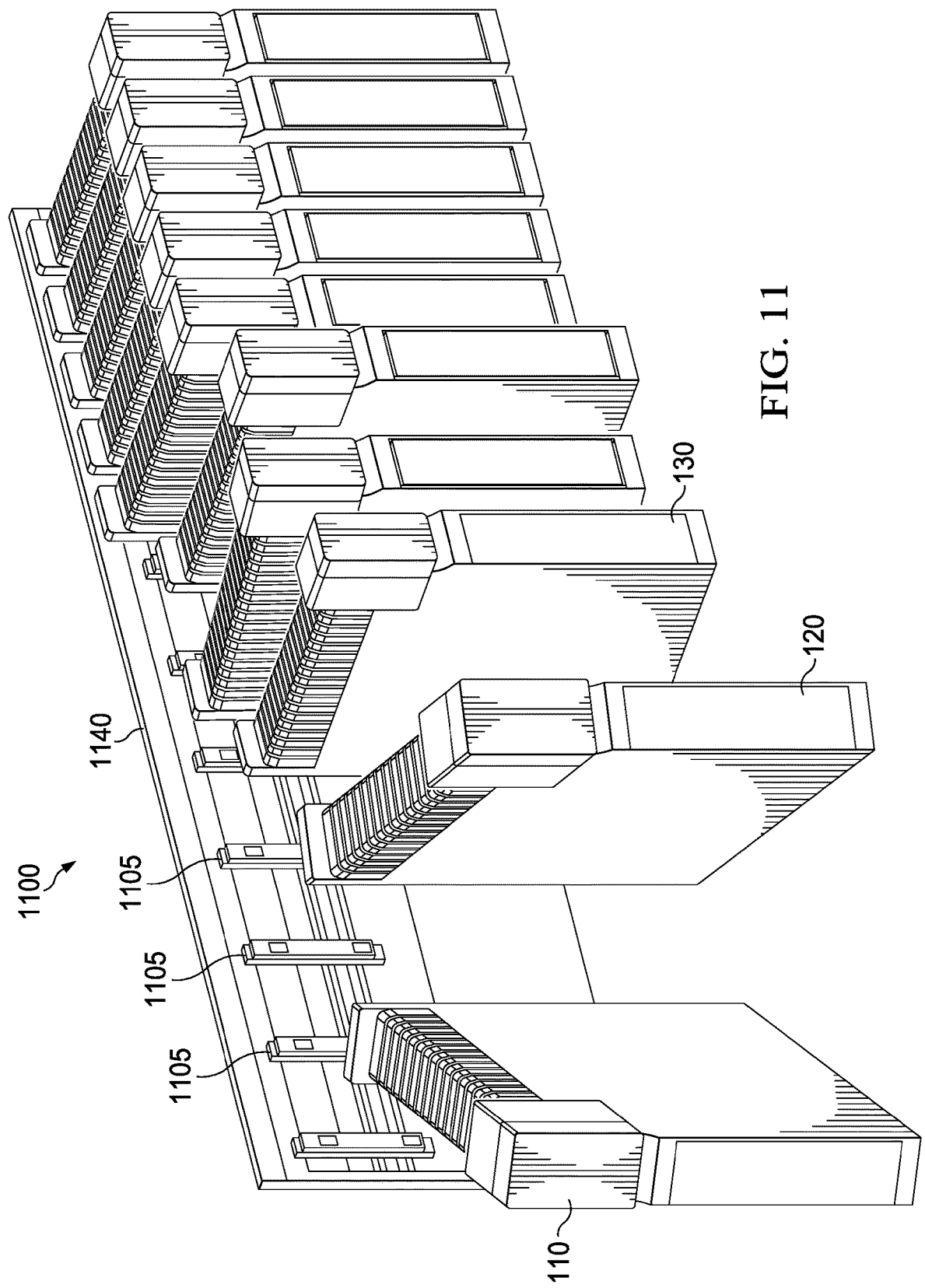
FIG. 11 is a pictorial illustration of the example system of FIG. 1.

FIG. 11 is a pictorial illustration of an example system 1100, which is another view of system 100 of FIG. 1. In this example, backplane 1140 provides a set of NFC coupling structures 1105 for providing power and data communication to each line card, as described hereinabove. In this example, an NFC coupling structure (similar to NFC coupling structure 306) interfaces with line card modules (similar to line card modules 120, 130 of FIG. 1). However, other examples may use different configurations of modules and backplane as described hereinabove.

In the example of FIG. 11, each line card module is removable from backplane 1140 by simply pulling the module to disconnect it from a mechanical retention mechanism (not shown). Usually, a rack or chassis (along with backplane 1140) will support the line cards and position them near NFC structures on the backplane when they are inserted into the rack.

Each line card module is enclosed in a housing, which may be made from plastic or other suitable materials. As described in more detail hereinabove, each line card may have an NFC coupler arranged to form a contactless communication port, which is positioned near a respective NFC coupler structure on backplane 1140 to provide both power and data communication without ohmic contacts. In this manner, voltage isolation is provided for each line card, along with reliable operation.

Figure 12:
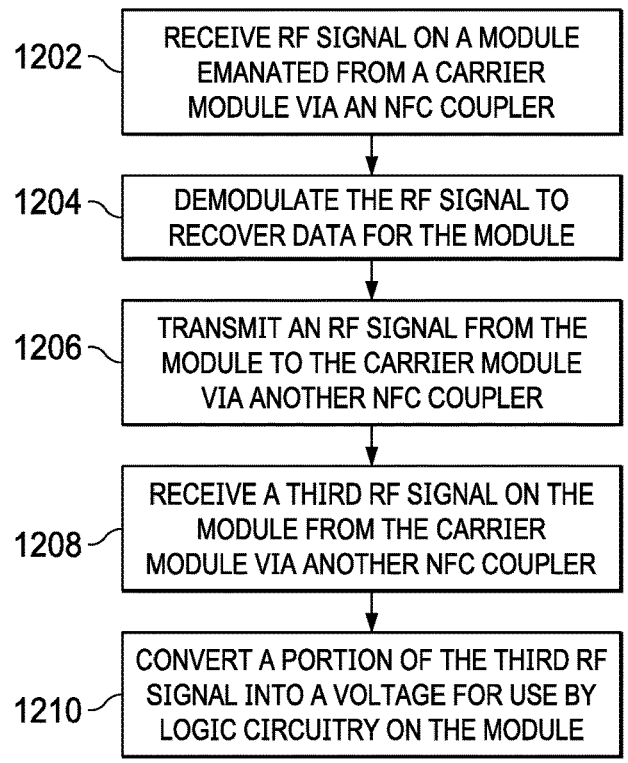
FIG. 12 is a flow diagram of contactless transfer of data and power to modules of a system using NFC.

FIG. 12 is a flow diagram of contactless transfer of data and power to modules of a system using NFC. As described hereinabove in more detail, the modules may be part of a programmable logic control system for industrial, commercial or residential applications. An example system may include a rack or chassis into which a set of modules are installed. Each module may communicate with an adjacent neighbor module using near field communication, in which an RF signal generated in one module may be EM coupled to a receiver a backplane carrier module and then EM coupled to an adjacent module using near field coupling or evanescent coupling, or any combination of these modes.

At 1202, a radio frequency (RF) signal may be received in a module. In the example of FIGS. 1-11, the RF signal may have a frequency in the range of 10-30 GHz. However, other systems may use RF signals at a higher or lower frequency by adjusting the physical size of the field coupling and field confining components described herein.

The RF electromagnetic field may be emanated from a carrier module, such as a backplane, with a near field communication (NFC) coupler on the carrier module. The RF electromagnetic field may be the result of a standing wave formed in a resonant structure in a conductive layer, such as described in more detail with regard to FIGS. 5C and 10.

At 1204, the RF signal is demodulated to provide a data signal for use by the module. A deaggregation operation may be needed to separate first data (destined for the present module) from second data (destined for other modules in the system).

At 1206, a second RF signal representing data produced by the module may be transmitted via a second NFC coupler on the module to the carrier module. As described hereinabove in more detail, the multiple modules in the system may communicate in a daisy chained manner, such that any module may communicate with any other module in the system.

A known standard communication protocol, such as the Internet Protocol (IP) may be used, treating the daisy chained NFC physical media as an Ethernet. The Internet Protocol (IP) is the principal communications protocol in the Internet protocol suite for relaying datagrams across network boundaries. IP has the task of delivering packets from the source host to the destination host based on IP addresses in the packet headers. For this purpose, IP defines packet structures that encapsulate the data to be delivered. It also defines addressing methods to label the datagram with source and destination information. The first major version of IP, Internet Protocol Version 4 (IPv4), is the dominant protocol of the Internet. Its successor is Internet Protocol Version 6 (IPv6).

Another example may use another known or later developed communication protocol for communication using the daisy chained NFC physical media as described herein. Another example may use known or later developed communication protocol in a point-to-point configuration, such as illustrated in FIG. 2.

At 1208, a third RF signal is received on the module from the carrier module. In this example, the third RF signal may have a relatively low frequency, such as in the range of 5-10 MHz.

At 1210, the third RF signal is converted by an inverter on the module to produce a DC voltage for use by logic and circuitry on the module.

In this manner, examples may provide high throughput communication between removable modules of a system using near field communication techniques. Power may also be provided to each removeable module using NFC techniques. The techniques described herein may be less expensive than alternatives, such as optical couplers. NFC allows contactless communication between modules and thereby eliminates a need for additional voltage isolation in systems that may require isolation between modules.

A daisy chain configuration and a point-to-point configuration are described hereinabove. With the aid of an IC mounted on the backplane carrier, another example may handle the communication protocol by the backplane mounted IC and then communicate to the modules point-to-point between the backplane carrier and each module. This could either be the backplane protocol or even a further extracted signaling protocol.

In another example, the backplane bus may be routed in parallel to all modules in a multidrop arrangement, and a polling scheme in the protocol could be used.

A PLC system is described herein. Other examples may use the contactless NFC power and data communication technique described herein for many different types of systems that require reliability, voltage isolation, and easy installation.

In the PLC system described herein, the modules are oriented perpendicular to the backplane. In another example, the modules may be skewed other than perpendicular by appropriate configuration and placement of the NFC coils. This may be done to reduce overall system size.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described examples, and other examples are possible, within the scope of the claims.

What is claimed is:

1. A device comprising:
   a substrate;
   circuitry on the substrate, the circuitry having a data input and a power input;
   a receiver having a receiver input and a receiver output, the receiver output coupled to the data input, and the receiver configured to provide a data signal at the receiver output responsive to a first signal at the receiver input;
   a first near field communication (NFC) coupler coupled to the receiver input and configured to: receive first electromagnetic energy via contactless transfer; and provide the first signal to the receiver input responsive to the first electromagnetic energy;
   a power converter having a converter input and a converter output, the converter output coupled to the power input, and the power converter configured to provide power at the converter output responsive to a second signal at the converter input; and
   a second NFC coupler coupled to the converter input and configured to: receive second electromagnetic energy via contactless transfer; and provide the second signal to the converter input responsive to the second electromagnetic energy.

2. The device of claim 1, wherein the circuitry has a data output, the data signal is a first data signal, and the device further comprises:
   a transmitter having a transmitter input and a transmitter output, the transmitter input coupled to the data output, and the transmitter configured to provide a third signal at the transmitter output responsive to a second data signal at the transmitter input; and
   a third NFC coupler coupled to the transmitter output and configured to provide third electromagnetic energy via contactless transfer responsive to the third signal.

3. The device of claim 1, wherein the substrate has an end and a side, the side is longer than the end, and the first NFC coupler and the second NFC coupler are positioned at the end of the substrate.

4. The device of claim 1, further comprising a carrier module having a fin that extends from the carrier module, in which the first NFC coupler and the second NFC coupler are positioned at a surface of the fin.

5. The device of claim 1, further comprising a carrier module having a first fin and a second fin that extend from the carrier module, in which the first NFC coupler is positioned at a surface of the first fin, and the second NFC coupler is positioned at a surface of the second fin.

6. The device of claim 1, further comprising a backplane configured to provide the first electromagnetic energy and the second electromagnetic energy.

7. A device comprising:
   a substrate;
   circuitry on the substrate, the circuitry having a data output and a power output;
   a transmitter having a transmitter input and a transmitter output, the transmitter input coupled to the data output, and the transmitter configured to provide a first signal at the transmitter output responsive to a data signal at the transmitter input;
   a first near field communication (NFC) coupler coupled to the transmitter output and configured to provide first electromagnetic energy responsive to the first signal;
   a power converter having a converter input and a converter output, the converter input coupled to the power output, and the power converter configured to provide power at the converter output responsive to a second signal at the converter input; and
   a second NFC coupler coupled to the converter output and configured to provide second electromagnetic energy responsive to the provided power.

8. The device of claim 7, wherein the circuitry has a data input, the data signal is a first data signal, and the device further comprises:
   a receiver having a receiver input and a receiver output, the receiver output coupled to the data input, and the receiver configured to provide a second data signal at the receiver output responsive to a third signal at the receiver input; and
   a third NFC coupler coupled to the receiver input and configured to: receive third electromagnetic energy via contactless transfer; and provide the third signal to the receiver input responsive to the third electromagnetic energy.

9. The device of claim 7, wherein the substrate has an end and a side, the side is longer than the end, and the first NFC coupler and the second NFC coupler are positioned at the end of the substrate.

10. The device of claim 7, further comprising a carrier module having a fin that extends from the carrier module, in which the first NFC coupler and the second NFC coupler are positioned at a surface of the fin.

11. The device of claim 7, further comprising a carrier module having a first fin and a second fin that extend from the carrier module, in which the first NFC coupler is positioned at a surface of the first fin, and the second NFC coupler is positioned at a surface of the second fin.

* * * * *